Patented May 28, 1946

2,400,934

UNITED STATES PATENT OFFICE 2,400,934

AMINES AND PURIFICATION THEREOF

Reuben G. Jones, Indianapolis, Ind., assignor to Eli Lilly and Company, Indianapolis, Ind., a corporation of Indiana No Drawing. Application June 28, 1945, Serial No. 602,163

13 Claims. (Cl. 260—500)

This invention relates to the preparation of purified 1-diethylamino-4-aminopentane, and to certain intermediates which yield that product in pure form.

1-diethylamino-4-aminopentane has its main use in the preparation of quinacrine hydrochloride, a valuable anti-malarial compound. For this preparation, which comprises combining 1-diethylamino-4-aminopentane with 2-methoxy-6,9-dichloroacridine, it is desirable to have a substantially pure 1-diethylamino-4-aminopentane. Its usual impurities react with the 2-methoxy-6,9-dichloroacridine, to interfere with the desired reaction, and cause poor yields and loss of the expensive reactants. In addition, the reaction products of the impurities contaminate the desired quinacrine hydrochloride, and create difficulties in its necessary purification.

1-diethylamino-4-aminopentane may be synthesized by any of at least three known methods. As so prepared, however, it is contaminated with a variety of alcoholic and amine-like impurities, depending on the synthesis used. Frequently occurring impurities comprise β-diethyl-amino-ethanol, 1-diethylamino-pentanone-4, 1-diethyl-aminopentanol-4, and others. The impure synthetic products have been partially purified by fractional distillation.

But several contaminants have boiling points which range fairly close to the boiling point of the desired 1-diethylamino-4-aminopentane; hence, high purity can not readily be obtained by fractional distillation.

The present invention provides a simple and inexpensive method of obtaining good yields of 1-diethylamino-4-aminopentane in what appears to be a chemically pure state.

I have discovered that 1-diethylamino-4-aminopentane will react with carbon disulfide to form a crystalline 1-diethylamino-4-aminopentane dithiocarbamate, and surprisingly that this dithiocarbamate is substantially insoluble in water, alcohol, acetone, and other common solvents. I have discovered further that the impurities which are commonly copresent with 1-diethylamino-4-aminopentane in the impure product of its synthesis form no such insoluble products.

I have discovered that if a solution containing 1-diethylamino-4-aminopentane and such impurities as commonly occur in the synthetic product is treated with carbon disulfide, an insoluble, crystalline 1-diethylamino-4-aminopentane dithiocarbamate is formed which may readily be separated from the impurities, in a quantitative yield. I have found also that the dithiocarbamate thus obtained may readily be decomposed to give a high yield of pure 1-diethylamino-4-aminopentane.

In the practice of my invention, the synthesis of 1-diethylamino-4-aminopentane may be carried out in known manner, to produce a reaction mixture containing the desired 1-diethylamino-4-aminopentane. Preferably, this is partially purified, as by fractional distillation, to remove impurities which are readily separated by this means, and to yield a mixture containing a preponderant amount of 1-diethylamino-4-aminopentane. Such partially purified 1-diethylamino-4-aminopentane mixtures are now available commercially.

The impure 1-diethylamino-4-aminopentane is dissolved in water, or in an aqueous mixture of an organic solvent such as acetone or an alcohol, and is treated with a slight excess of carbon disulfide. A reaction occurs promptly, to form a crystalline precipitate, which is 1-diethylamino-4-aminopentane dithiocarbamate hemihydrate. The precipitate is recovered by filtration, washed with a small amount of solvent, and dried.

Instead of carrying out the foregoing reaction in the presence of water, it may be carried out in anhydrous alcohol, such as methyl or ethyl alcohol. In such case, instead of the hemihydrate, the hemialcoholate of the dithiocarbamate is produced. As a third alternative, the reaction may be carried out in a dry inert solvent, as in anhydrous ether or benzene; in which case the crystalline product is anhydrous 1-diethylamino-4-aminopentane dithiocarbamate itself, without any solvent of crystallization.

I thus obtain as a new product a 1-diethylamino-4-aminopentane dithiocarbamate, either with or without a solvent of crystallization. (By "a 1-diethylamino-4-aminopentane dithiocarbamate," I mean to include both the dithiocarbamate and the solvates thereof.)

Both the dithiocarbamate itself and its hemi-alcoholate are readily converted to the hemihydrate by treatment with water. The hemihydrate is soluble in water to the extent of 1.175 g. per 100 ml. and in 95% alcohol to the extent of 0.048 g. in 100 ml. at 30° C. Its solubility is extremely small in acetone, ether, carbon disulfide, and benzene. The dithiocarbamate is readily soluble in aqueous alkali solutions; and acids decompose it with the liberation of carbon disulfide.

To obtain pure 1-diethylamino-4-aminopentane, a 1-diethylamino-4-aminopentane dithiocarbamate is suspended in water and treated with a slight excess of a mineral acid, such as hydrochloric or sulfuric acid. This causes the decomposition of the addition product, with the formation of free carbon disulfide and the salt of 1-diethylamino-4-aminopentane, which salt dissolves in the aqueous solution. The carbon disulfide is removed from the mixture by any convenient means, such as by extraction or fractional distillation at atmospheric or reduced pressures, to leave an aqueous solution containing the salt (for example, the dihydrochloride) of 1-diethylamino-4-aminopentane. If desired, the salt may be recovered as such. Preferably, however, the aqueous solution is made alkaline, as by adding an excess of concentrated sodium hydroxide solution, which liberates as a free base the desired 1-diethylamino-4-aminopentane. The liberated diamine forms a layer on the aqueous phase, and is separated therefrom, conveniently by taking it up with a solvent such as ether. The ether solution is dried as with anhydrous potassium carbonate, and the ether is removed, as by distillation. This produces the desired 1-diethylamino-4-aminopentane in pure form, and in yields of more than 90% of the amount present in the impure starting mixture.

Pure 1-diethylamino-4-aminopentane obtained by this procedure has the following constants: boiling point, 200-200.5° C. (753 mm.); $n_D^{26}$, 1.4403 (temperature coefficient=0.00045 per degree); $d_{26}^{20}$, 0.819. It is found that these constants do not change upon repeated reprecipitation of the amine as the dithiocarbamate, followed by reconversion back to the free amine.

The following are examples of my process:

*Example 1.*—To a solution of 110 g. of carbon disulfide in 500 ml. of 95% alcohol cooled in an ice bath, there is added with stirring 220 g. of impure 1-diethylamino-4-aminopentane (boiling point 190-202° C.). A crystalline precipitate forms, and this is filtered off, washed with a little alcohol, suspended in 500 ml. of water, again filtered, and dried in air. This precipitate is 1-diethylamino-4-aminopentane dithiocarbamate hemihydrate, which has the formula $$C_{10}H_{22}N_2S_2 \cdot \tfrac{1}{2}H_2O$$

an melts with decomposition at about 136-138° C. (uncorrected.)

To 243 g. of 1-diethylamino-4-aminopentane dithiocarbamate hemihydrate suspended in 500 ml. of water, 250 ml. of 12 N hydrochloric acid is added. All of the suspended solid dissolves and carbon disulfide separates. The carbon disulfide is distilled from the mixture and the residual aqueous solution is concentrated by evaporation in vacuo to a sirupy consistency. An excess of concentrated sodium hydroxide solution is added to this sirup, which causes 1-diethylamino-4-aminopentane to separate as an oily layer. This oily material is taken up in ether and separated from the aqueous layer. The ethereal solution is dried over solid potassium hydroxide, ether is removed by evaporation, and the residue is distilled at atmospheric pressure. This yields pure 1-diethylamino-4-aminopentane, boiling at 200-200.5° C. at 753 mm. pressure, in a yield of about 94% of the amount theoretically obtainable from the impure starting material.

*Example 2.*—To a solution of 25 g. of carbon disulfide in 50 ml. of absolute alcohol, cooled in an ice bath, there is slowly added 20 g. of impure 1-diethylamino-4-aminopentane (boiling at 190-202° C.). A crystalline precipitate forms, which is recovered by filtration, washed with an additional quantity of absolute alcohol and dried. It is a 1-diethylamino-4-aminopentane dithiocarbamate hemialcoholate, which has the formula $C_{10}H_{22}N_2S_2 \cdot \tfrac{1}{2}C_2H_5OH$, and melts with decomposition at about 136-138° C.

This hemialcoholate is then suspended in water and treated as in Example 1, to yield pure 1-diethylamino-4-aminopentane.

*Example 3.*—To about 1 g. of an impure 1-diethylamino-4-aminopentane sample in a 100 ml. beaker, 20 ml. of dry acetone is added by washing down the sides of the beaker, and this is followed by 0.75 ml. (15 drops) of water. To the resulting solution there is added 10 ml. of a 15% (by volume) solution of carbon disulfide in acetone. The mixture turns light brown, and after a few seconds a white crystalline precipitate begins to appear. The mixture is stirred for about one minute, by which time precipitation is largely complete, and is then allowed to stand for one-half hour. Then, 25 ml. of acetone are added, the mixture is again stirred, and permitted to stand for an additional one-half hour. The precipitate is loosened from the walls of the beaker, and the supernatant liquid is decanted through a filtering crucible. The precipitate is washed with two 10-15 ml. portions of acetone and then transferred to the crucible with acetone. The precipitate is sucked as dry as possible, and then further dried over anhydrous calcium chloride in a vacuum desiccator. Drying was complete in about 5 to 8 hours. The dried precipitate is 1-diethylamino-4-aminopentane dithiocarbamate hemihydrate, having the formula $$C_{10}H_{22}C_2S_2 \cdot \tfrac{1}{2}H_2O$$

The reaction of the carbon disulfide with the 1-diethylamino-4-aminopentane contained in the original impure sample is substantially quantitative, so that with care as indicated in this example, the foregoing process may be used for quantitative analysis.

*Example 4.*—Example 3 is repeated, save that instead of aqueous acetone, dry, alcohol-free ether is used as the solvent. A precipitate is obtained which is 1-diethylamino-4-aminopentane dithiocarbamate, containing no solvent of crystallization. Like the hemihydrate and the hemialcoholate, it melts with decomposition at about 136-138° C.

I claim as my invention:

1. The process of obtaining purified 1-diethylamino-4-aminopentane from an impure mixture containing it, which comprises treating said mixture with carbon disulfide, to produce a 1-diethylamino-4-aminopentane dithiocarbamate, separating said dithiocarbamate from the reaction mixture, and treating said dithiocarbamate to liberate 1-diethylamino-4-aminopentane.

2. The process of obtaining purified 1-diethylamino-4-aminopentane from an impure mixture containing it, which comprises treating said mixture with carbon disulfide in a solvent to produce an insoluble 1-diethylamino-4-aminopentane dithiocarbamate, separating said dithiocarbonate from the reaction mixture, and treating said dithiocarbamate to liberate 1-diethylamino-4-aminopentane.

3. The process of obtaining purified 1-diethylamino-4-aminopentane from an impure mixture containing it, which comprises treating said mixture with carbon disulfide in the presence of water, to produce 1-diethylamino-4-aminopentane dithiocarbamate hemihydrate, separating said dithiocarbamate from the reaction mixture, and treating said dithiocarbamate to liberate 1-diethylamino-4-aminopentane.

4. The process of obtaining purified 1-diethylamino-4-aminopentane from an impure mixture containing it, which comprises treating said mixture with carbon disulfide in an anhydrous solvent and in the presence of an alcohol, to produce 1-diethylamino-4-aminopentane dithiocarbamate hemialcoholate, separating said dithiocarbamate from the reaction mixture, and treating said dithiocarbamate to liberate 1-diethylamino-4-aminopentane.

5. The process of obtaining purified 1-diethylamino-4-aminopentane from an impure mixture containing it, which comprises treating said mixture with carbon disulfide, to produce a 1-diethylamino-4-aminopentane dithiocarbamate, separating said dithiocarbamate from the reaction mixture, and treating said dithiocarbamate with aqueous acid to liberate a salt of 1-diethylamino-4-aminopentane, and converting said salt to the free amine, 1-diethylamino-4-aminopentane.

6. The process of separating 1-diethylamino-4-aminopentane from contaminants which occur in mixtures produced by its synthesis, which comprises treating with carbon disulfide a mixture containing 1-diethylamino-4-aminopentane and one or more of said contaminants to selectively precipitate a reaction product of said 1-diethylamino-4-aminopentane with said carbon disulfide, recovering said reaction product, and treating it to liberate 1-diethylamino-4-aminopentane.

7. The process of separating 1-diethylamino-4-aminopentane from contaminants which occur in mixtures produced by its synthesis and have boiling points near the boiling point of said 1-diethylamino-4-aminopentane, which comprises treating with carbon disulfide a mixture containing 1-diethylamino-4-aminopentane and one or more of said contaminants to selectively precipitate a reaction product of said 1-diethylamino-4-aminopentane with said carbon disulfide, recovering said reaction product, and treating it to liberate 1-diethylamino-4-aminopentane.

8. The process which comprises treating with carbon disulfide an impure mixture containing 1-diethylamino-4-aminopentane, to produce a 1-diethylamino-4-aminopentane dithiocarbamate, and separating said dithiocarbamate from the reaction mixture.

9. The process of preparing a 1-diethylamino-4-aminopentane dithiocarbamate, which comprises treating 1-diethylamino-4-aminopentane with carbon disulfide in a liquid carrier.

10. A 1-diethylamino-4-aminopentane dithiocarbamate.

11. 1-diethylamino-4-aminopentane dithiocarbamate having the formula $C_{10}H_{22}N_2S_2$.

12. 1-diethylamino-4-aminopentane dithiocarbamate hemihydrate, having the formula $$C_{10}H_{22}N_2S_2 \cdot \tfrac{1}{2}H_2O$$

13. The hemialcoholates of 1-diethylamino-4-aminopentane dithiocarbamate.

REUBEN G. JONES.